April 15, 1941.     E. HODALY     2,238,322
BABY CARRIAGE
Filed March 13, 1940

Inventor
Emerick Hodaly

J. C. Murray
Attorney

Patented Apr. 15, 1941

2,238,322

UNITED STATES PATENT OFFICE 2,238,322

BABY CARRIAGE

Emerick Hodaly, Detroit, Mich.

Application March 13, 1940, Serial No. 323,692

6 Claims. (Cl. 188—20)

This invention relates to baby carriages and particularly to automatic brakes for such carriages, and is an improvement on construction shown by my Patent 2,191,760, issued February 27, 1940.

A general object of the invention is to provide improved and simplified means for preventing uncontrolled travel of a baby carriage down declivities or responsive to wind pressure.

Another object is to adapt a brake of the type shown in my previous patent for use on carriages having non-rotative axles.

A further object is to effect braking of a baby carriage by insertion of a braking member between spokes of a wheel of the carriage, and to facilitate such insertion by affording the braking member a rocking movement.

These and various other objects the invention attains by the construction hereinafter described and illustrated in the accompanying drawing, wherein.

Figure 1:
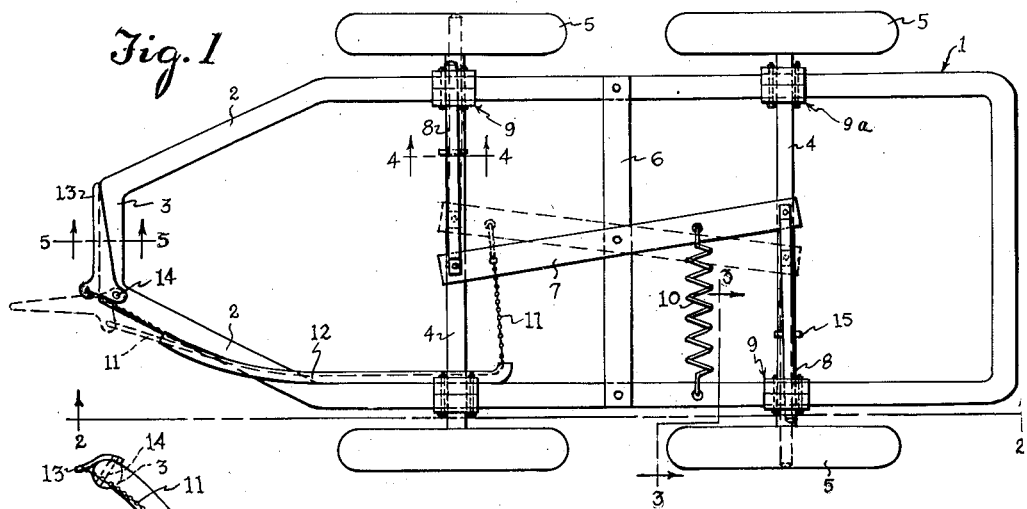
Fig. 1 is a top plan view of the wheeled frame of a baby carriage, showing the brake released and indicating in dash lines its applied position.
Figure 2:
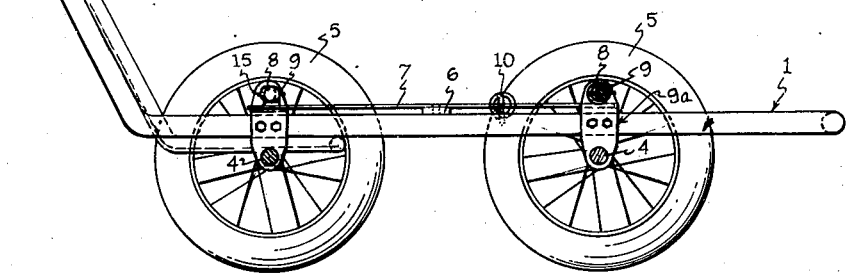
Fig. 2 is a vertical sectional view of the same taken on the line 2—2 of Fig. 1.

In these views the reference character 1 designates a baby carriage frame, preferably formed of metal tubing and having handle-forming rear end portions 2 extending upwardly at a gradual convergence and interconnected by a grip bar 3. Said frame is mounted on suitably spaced non-revoluble front and rear axles 4 having spoked wheels 5 journaled on their ends.

Figures 3, 4, 5:
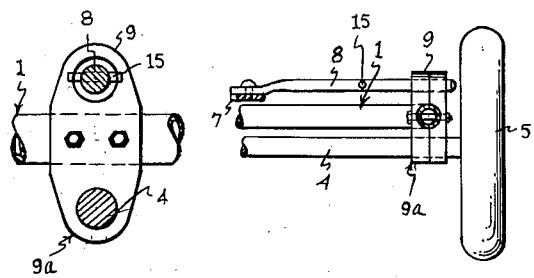
Fig. 3 is a fragmentary vertical section taken on the line 3—3 of Fig. 1, particularly showing one of the wheels and associated brake mechanism.
Fig. 4 is an enlarged vertical section taken on the line 4—4 of Fig. 1, and showing a guide bracket for a sliding brake member.
Fig. 5 is a vertical sectional detail of a control element for the brake, taken on the line 5—5 of Fig. 1.

Midway between said axles a cross bar 6 is riveted or otherwise rigidly secured to the frame 1 and centrally pivoted on such bar is a lever 7 extending lengthwise of the frame and having its ends projecting above the axles. Pivoted to opposite ends of the lever and projecting oppositely outwardly therefrom above the frame and into proximity with a front and a rear wheel, is a pair of elongated braking members 8 approximately parallel to the axles and freely slidable through a pair of guides 9, formed integrally with fittings 9a which rigidly interconnect the frame and axles. (See Figs. 3 and 4.) A coiled spring 10 connecting rear portion of said lever to the frame urges the lever angularly in a direction to actuate the braking members 8 outwardly in the guides 9 and between the spokes of the wheels. To the forward portion of the lever 7 is attached a chain or other flexible connection 11 extending through a guide tube 12 along one of the handle members 2 and connected to a short arm of a bell crank control lever 13 pivoted at 14 on the rear end of said handle member. The long arm of the bell crank lever is transversely curved so that it may lie closely against and partially embrace the grip bar 3. (See Fig. 5.)

It is to be noted that the braking members 8 may not move in straight lines when projected toward or withdrawn from wheels, since the lever-engaging ends of said members travel arcuately. It is preferred therefore that sufficient clearance be provided in the guides 9 to afford a material lateral play of the braking members. Provision of such clearance also facilitates entrance of the members 8 between the spokes, since it permits such members to deflect laterally to avoid spokes encountered by their rounded free ends. The guides are of a durable construction since they must resist the entire torque stress transmitted through the braking mechanism from the wheels. Each of the braking members carries a pin 15 limiting its response to the spring 10.

In operation of the described brake, the spring 10 holds the lever 7 in braking position when the bell crank lever is free, both levers then assuming the positions shown in dash lines in Fig. 1. In this location of the parts the braking members 8 are projected between the spokes of the adjacent wheels, effectively preventing rotation of such wheels. When the carriage is being propelled, the bell crank is maintained in brake-releasing position (shown in full lines in Fig. 1) by a hand or hands (not shown) gripping the bar 3.

The invention is presented as including all such changes and modifications as come within the scope of the following claims.

What I claim is:

1. In a wheeled vehicle, a frame, a lever extending longitudinally of the frame, means engaging such lever between its ends and pivoting it on the frame for a lateral rocking movement, a braking member laterally projecting from the lever and extending into proximity to a wheel of the vehicle, such wheel having an element for engagement with the braking member to oppose rotation of the wheel, means biasing said lever laterally in a direction urging the braking member into the path of said wheel element, a handle for propelling the vehicle, a controller for the lever mounted on the handle, and a connection from the controller to the lever for actuating the lever in resistance to said biasing means.

2. In a wheeled vehicle as set forth in claim 1, means pivoting the braking member on the lever, and means carried by the frame for guiding the braking member in travel to and from the adjacent wheel and for resisting torque stresses transmitted from said wheel.

3. In a wheeled vehicle as set forth in claim 1, means pivoting the braking member on the lever, and a bracket carried by the frame for guiding the braking member in travel to and from the adjacent wheel, the braking member being rockable in the bracket to adjust itself to angular travel of the lever.

4. In a vehicle having spoked wheels and a frame, a lever extending longitudinally of the frame, means pivoting the lever on the frame for a lateral rocking movement, a braking member pivotally connected to the lever remotely from the lever pivot, and extending in proximity to one of said wheels, means biasing the lever laterally and thereby urging the braking member between the spokes of the adjacent wheel, a guide for the braking member in its movement to and from the adjacent wheel, said guide affording such member a rocking movement to adjust itself to angular travel of the lever and to facilitate its entrance between the spokes, a handle for propelling the vehicle, a controller for the lever mounted on the handle, and a connection from the controller to the lever for actuating the lever in resistance to said biasing means.

5. A vehicle comprising front and rear wheels and a frame jointly carried by such wheels, a lever extending longitudinally of the vehicle, means pivoting the lever substantially midway of its length upon the frame, a pair of braking members attached to opposite end portions of the lever and extending oppositely laterally into proximity to one of the front wheels and one of the rear wheels, such wheels having elements for engaging the braking members to oppose rotation of such wheels, means biasing the lever laterally toward an angular position establishing the braking members in the paths of said wheel elements, a handle for propelling the vehicle, a controller for the lever mounted on the handle, and a connection from the lever to the handle for actuating the lever in resistance to said biasing means.

6. In a vehicle as set forth in claim 5, means pivotally connecting said braking elements to the lever, and guides individually associated with the braking elements guiding such elements in travel to and from the adjacent wheels and transmitting to the frame stresses imposed by a braking operation.

EMERICK HODALY.